(12) United States Patent
Hurst et al.

(10) Patent No.: US 7,149,545 B2
(45) Date of Patent: Dec. 12, 2006

(54) METHOD AND APPARATUS FOR FACILITATING OVER-THE-AIR ACTIVATION OF PRE-PROGRAMMED MEMORY DEVICES

(75) Inventors: Leon Hurst, Helsinki (FI); Samuli Tuoriniemi, Oulu (FI)

(73) Assignee: Nokia Corporation, Espoo (FI)

( * ) Notice: Subject to any disclaimer, the term of this patent is extended or adjusted under 35 U.S.C. 154(b) by 412 days.

(21) Appl. No.: 10/161,080

(22) Filed: May 30, 2002

(65) Prior Publication Data

US 2003/0224823 A1  Dec. 4, 2003

(51) Int. Cl.
*H04B 1/38* (2006.01)
*H04M 1/66* (2006.01)
*H04N 7/167* (2006.01)

(52) U.S. Cl. ............... 455/558; 455/410; 455/411; 380/201; 380/203

(58) Field of Classification Search ........ 455/558, 455/418, 425, 411, 550, 422; 713/158; 705/41, 705/65, 45
See application file for complete search history.

(56) References Cited

U.S. PATENT DOCUMENTS 6,216,014 B1* 4/2001 Proust et al. ........... 455/558
2002/0131594 A1* 9/2002 Hori et al. ............. 380/201
2002/0136405 A1* 9/2002 Hori .................... 380/203
2002/0138442 A1* 9/2002 Hori et al. .............. 705/59
2002/0180582 A1* 12/2002 Nielsen ................. 340/5.6
2002/0184492 A1* 12/2002 Hori et al. .............. 713/158
2004/0043788 A1* 3/2004 Mittal .................. 455/558

OTHER PUBLICATIONS

"Digital Rights Management and Superdistribution of Mobile Content", copyrighted 2001.

* cited by examiner

*Primary Examiner*—Joseph Feild
*Assistant Examiner*—Julio Perez
(74) *Attorney, Agent, or Firm*—Hollingsworth & Funk, LLC

(57) ABSTRACT

A system, apparatus, and method for facilitating OTA activation of protected content pre-programmed on a memory device that is operable on mobile terminals. A removable memory device is provided for coupling to the mobile terminal, where the removable memory device is pre-programmed with secure content and a secure rights database of rights files. OTA activation is performed to activate the secure content stored on the removable memory device in response to an attempt to access the secure content. The removable memory device is altered to prohibit further access to the secure rights database after the database is imported to the mobile terminal. Access to the secure content is enabled as dictated by corresponding rights files when the OTA activation has successfully completed.

58 Claims, 9 Drawing Sheets

METHOD AND APPARATUS FOR FACILITATING OVER-THE-AIR ACTIVATION OF PRE-PROGRAMMED MEMORY DEVICES

FIELD OF THE INVENTION

This invention relates in general to mobile communications, and more particularly to a method, system, and apparatus for facilitating over-the-air (OTA) activation of secure content pre-programmed on memory devices operable on mobile terminals.

BACKGROUND OF THE INVENTION

New technologies are continually emerging, enabling new types of content to be delivered over mobile networks for use with mobile terminals. The success of Short Message Service (SMS) fueled further developments such as Enhanced Messaging Service (EMS), Multimedia Messaging Service (MMS), and other communications protocols which allow the transmission of more than merely textual content. These and other new technologies allow for a variety of different types of content to be communicated to and from mobile (and landline) devices, including ringing tones, icons, Java games, video clips, software tools, etc.

However, with the increasing use of multimedia content on mobile devices, it can be difficult to store and/or transfer these voluminous pieces of content on mobile terminals such as mobile telephones. Because multimedia content can be quite sizeable in terms of digital volume, providing content on removable memory cards rather than over-the-air (OTA) has become a popular way of distributing digital content to mobile users.

For this type of digital content delivery to be beneficial for all parties concerned, solid methods for managing the access and use of the content needs to be in place. To ensure business profitability, content retailers/providers' copyrights need to be protected to provide an incentive for such providers to continue developing and publishing digital content. Content retailers include, for example, operator portals, various media companies, and entrepreneurs. One manner of providing such protection is to secure the content on removable memory cards, so that only authorized users can access, use, or distribute the content.

However, current solutions for allowing access to such secure content are generally too complex for mobile content solutions, or limited to configurations at the time of manufacturing of the mobile terminals in which the removable memory cards will be installed. For example, existing solutions for securing content includes large-scale, complex third-party software/hardware solutions (e.g., for high-quality music), or the use of secure removable media technology such as Secure MMC™. With respect to the complex third-party solutions, such solutions are targeted at very valuable content, which is often an unnecessary and overly expensive solution for mobile content. Further, such solutions are proprietary and are not interoperable, and are of a significant size that is simply not useful in the context of small, mobile communication devices. With respect to secure removable media technology, these solutions only address the problem of security on the memory card, and do not address security at the implementation level. Content retailers are also forced to use these expensive special-purpose cards if security is desired, which adversely affects profitability.

Furthermore, existing solutions provide a manner of allowing access to secure content by configuring a terminal at the time of manufacturing of the mobile terminal. The prior art does not provide an adequate solution for allowing on-demand access to secured content pre-programmed onto a portable memory device that can be used on a mobile user's existing mobile terminal.

Accordingly, there is a need in the communications industry for a manner of providing mobile terminal users with on-demand activation of secured content provided on portable memory devices. The present invention fulfills these and other needs, and offers other advantages over the prior art.

SUMMARY OF THE INVENTION

The present invention is directed to over-the-air activation of protected content pre-programmed on a memory device that is operable on mobile terminals.

In accordance with one embodiment of the invention, a method is provided for allowing access to secure content via a mobile terminal. The method includes providing a removable memory device for coupling to the mobile terminal, where the removable memory device is pre-programmed with secure content and a secure rights database of rights files. The method further includes conducting over-the-air (OTA) activation of the secure content stored on the removable memory device in response to an attempt to access the secure content. Access to the secure content is enabled as dictated by corresponding rights file when the OTA activation has successfully completed.

In accordance with a more particular embodiment of the method for allowing access to secure content via a mobile terminal, OTA activation includes disabling a security feature protecting the secure rights database on the removable memory device in response to OTA activation information received at the mobile terminal. The rights files associated with the secure rights database are imported from the removable memory device to an active rights database in the mobile terminal. The secure rights database on the removable memory device is then disabled from further use, such as by removing or overwriting the secure rights database.

In accordance with another embodiment of the invention, a method is provided for facilitating access to secure content via a mobile terminal. The method includes providing a removable memory device pre-programmed with secure content and a secure rights database of rights files, where the secure content is associated with an activation address. The mobile terminal is equipped with the removable memory device, and an OTA activation request is initiated from the mobile terminal to an activation service identified by the activation address. A security feature protecting the secure rights database is removed to make available the corresponding rights database, in response to information received OTA from the activation service. The rights database from the removable memory device is imported to an active rights database in the mobile terminal, and the rights database on the removable memory device is disabled from further use, such as by removing or overwriting it. In a more particular embodiment, the activation address is provided via metadata associated with the secure content that is being accessed.

In accordance with another embodiment of the invention, a mobile terminal is provided that includes a memory card pre-programmed with secure content and a secure rights database of rights files, where the secure content has associated metadata including an activation address. The mobile terminal includes an active rights database, and a transceiver to send and receive OTA transmissions between the mobile terminal and an activation service identified by the activation address. A processor is configured to send an OTA activation request via the transceiver to the activation service and receive an OTA activation response from the activation service via the transceiver, to decrypt the secure rights database using an encryption key provided via the OTA activation response and import the rights files from the memory card into the active rights database, and to disable the secure rights database on the memory card from unauthorized use.

In accordance with another embodiment of the invention, a system is provided for distributing content on removable memory devices in a secure manner. The system includes a network for communicating wireless data transmissions, and a network activation service coupled to the network and accessible via a network address. Any number of mobile terminals capable of communicating wireless data transmissions via the network may be operated on the network. Each of the mobile terminals in accordance with the present invention include a removable memory card pre-programmed with secure content and a secure rights database of rights files, where the secure content has associated metadata including the network address of the network activation service. The mobile terminals include a transceiver to communicate wireless data transmissions between the mobile terminal and the network activation service, and an active rights database. The mobile terminals further include a processor configured to send a wireless activation request via the transceiver to the network activation service and receive a wireless activation response from the network activation service via the transceiver, to decrypt the secure rights database using an encryption key provided via the wireless activation response and import the rights files from the removable memory card into the active rights database, and to disable the secure rights database on the removable memory card from unauthorized use.

In accordance with another embodiment of the invention, a computer-readable medium having computer-executable instructions for allowing access to secure content via a mobile terminal is provided. The secure content, associated metadata, and a secure rights database of rights files is provided on a pre-programmed portable memory device. The computer-executable instructions on the computer-readable medium perform steps including obtaining an address of an activation service from the metadata associated with the secure content to which user access is requested. Further, a OTA content activation is initiated with an activation service corresponding to the activation service address. A security feature that is protecting the secure rights database is disabled to make available the corresponding rights database in response to an encryption key received over-the-air from the activation service. The rights database is imported from the portable memory device to an active rights database in the mobile terminal, and further access to the rights database on the portable memory device is prohibited.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

The invention is described in connection with the embodiments illustrated in the following diagrams.

DETAILED DESCRIPTION OF THE INVENTION

Figure 1:
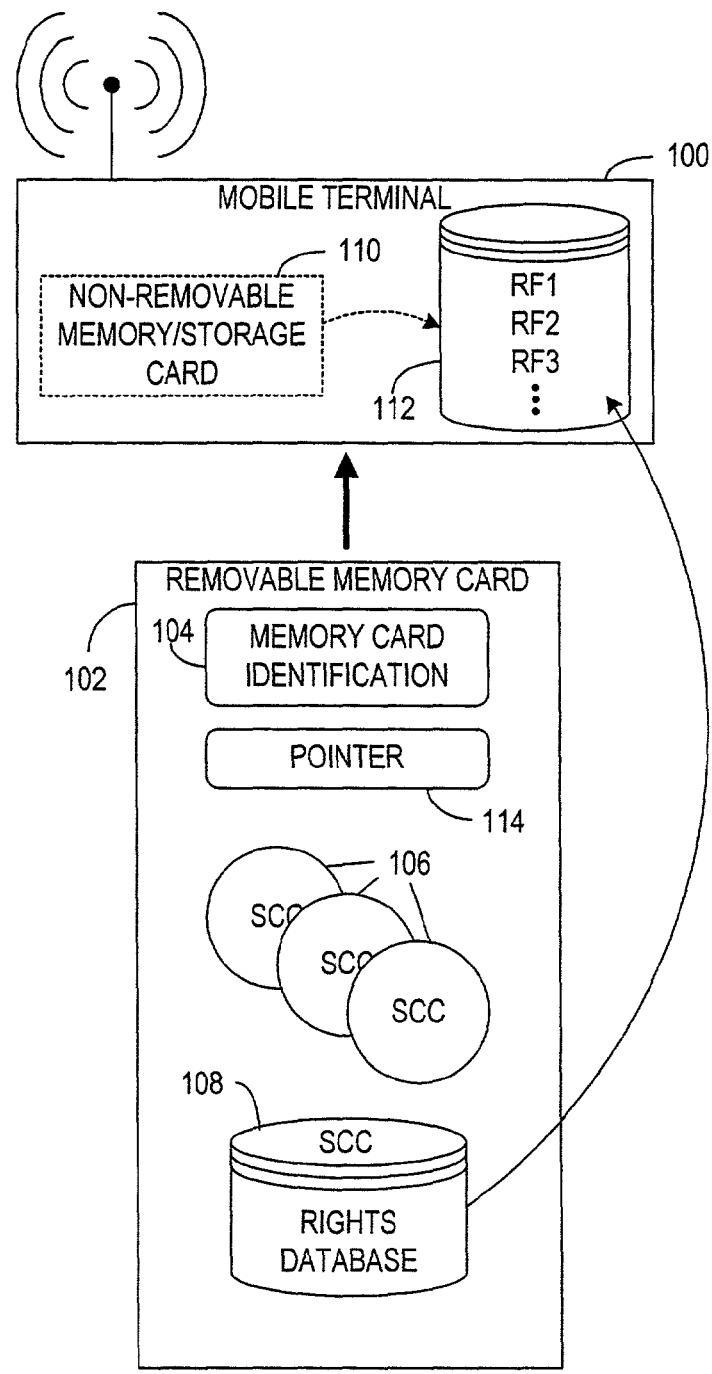
FIG. 1 is a block diagram of an exemplary embodiment of a mobile device and associated memory device which incorporates the principles of the present invention.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

In the following description of the exemplary embodiment, reference is made to the accompanying drawings which form a part hereof, and in which is shown by way of illustration the specific embodiment in which the invention may be practiced. It is to be understood that other embodiments may be utilized, as structural and operational changes may be made without departing from the scope of the present invention.

The protected content storage and over-the-air activation in accordance with the present invention is beneficial in a variety of contexts. One such context is in the content retailing industry, where unlawful transfers of content without the requisite payment can greatly impact the success of content retailers, developers, and authors. On the other hand, it is desirable to provide such content to users in various ways to accommodate the needs of different users, and to allow flexibility for content distribution. The present invention provides a manner of facilitating OTA activation of secured content on mobile terminal memory devices, thereby allowing various content delivery options while ensuring proper payment to content authors and distributors.

Content retailers include operator portals, various media companies and entrepreneurs. Payment collectors complement the content retailer's business by offering a platform for collecting payments. For example, mobile operators may serve as the payment collector, offering its billing platform for multiple content retailers. Other examples include external server-based payment systems that offer payment channels, e.g. for credit cards and debit cards, or terminal-based payment applications in which case there is no need for operator billing system in the payment process. Regardless of the payment methodology employed, the future service architecture must ensure that whenever content is consumed, the payment gets collected. This is vital to avoid losing revenue through unauthorized content transfers, such as through content "pirating."

Addressing unauthorized content delivery and/or receipt often involves delivery control methodologies, which controls the manner in which content can be delivered or transferred. An alternate control mechanism to delivery control is usage control. In accordance with the present invention, usage rights are expressed in rights files, created and optionally distributed separately from the content objects. The payment is collected against the issued rights files, where the control point lies in the mobile device middleware. In accordance with one embodiment of the invention, the mobile client requires both the content object and referring rights file to be present before executing the media.

The evolution from delivery control to usage control presents a new dimension to multichannel service discovery. The content may be discovered and purchased in several different ways, e.g., from viewing an ad in a magazine, or through a friend who may possess the content on his/her mobile device. The separation of the content object and rights file enables a friend to send content, such as ringing tones, icons, music, etc. to another mobile terminal using, for example, Multimedia Messaging Service (MMS) or other multimedia distribution methodology. Such peer-to-peer "superdistribution" facilitates advertising-free content distribution to people having similar interests, resulting in the consumers themselves becoming distributors. While such distribution schemes have great advantages, they also present a risk in terms of illegal or otherwise unauthorized copying of content.

Another manner in which content may be purchased is by purchasing the content for delivery on a memory device, such as a removable memory device that can be inserted into a user's mobile terminal. This may be beneficial where the content is otherwise too large for practical OTA transmission, or where a user has just started a subscription with an operator or mobile Internet Service Provider (mISP). Where operators, mISPs, or other content retailers provide a memory device pre-loaded with content to a subscriber/purchaser, it would be desirable to be able to provide the same memory device "image" to all purchasers, regardless of whether certain users will ever access portions of the content provided on that memory device. This is because the development, production, inventory, etc. costs associated with having multiple memory device content permutations is significantly higher than having only one memory device that has all available content provided thereon. In order to achieve this goal, it is imperative that the content on the single memory device "image" be securely stored until the user is authorized to use the content, such as by paying for the content. Content provided on removable memory devices, or stored on memory already existing in a mobile device, thus presents risks of unauthorized content usage and/or copying. For example, if the content is not securely stored and associated with particular usage rights, the user himself/herself could access certain content without authorization to do so (e.g., without paying for "use" of the content). Further, it may be desirable from a marketing standpoint for content retailers to provide such a wide variety of content via permanent or removable devices in order to make it easy for users (or tempt users) to purchase the content. The present invention addresses such issues.

FIG. 1 is a block diagram of an exemplary embodiment of a mobile device and associated memory device which incorporates the principles of the present invention. In the embodiment of FIG. 1, a mobile terminal 100 is shown. The mobile terminal 100 may represent any of a number of mobile communication devices, such as a cellular telephone, personal digital assistant (PDA), notebook or laptop computer, mobile music players, or any other type of wireless communication device.

Associated with the mobile terminal 100 is some local memory and/or storage. Such memory may be integral to the mobile device, such as Random Access Memory (RAM), Read-Only Memory (ROM), or variations thereof such as flash ROM, Erasable Programmable ROM (EPROM), etc. Another type of memory that may be used in connection with current and future mobile terminals 100 is removable memory, such as the removable memory card 102 illustrated in FIG. 1. The memory card 102 represents any commercially-available or proprietary portable memory device, such as the MultiMediaCard (MMC) by SanDisk, Solid State Floppy Disk Card (SSFDC) by Toshiba Corp., Memory Stick® by Sony, or any other flash card, flash memory, or the like. Such removable memory cards 102 may be used by mobile users who already possess mobile terminals, or by those who have just purchased a new mobile terminal. For example, a person starting a subscription with an operator or mISP may receive the removable memory card 102 with his/her Subscriber Identity Module (SIM) or other module as part of starting the subscription. Providing such removable memory cards with mobile devices and/or associated subscriptions is becoming increasingly prevalent in the industry, as is over-the-air content distribution. Because multimedia content can be quite sizeable in terms of digital volume (and accordingly OTA transmission time), providing content on removable memory cards will continue to be a common manner of distributing content.

However, the valuable content should be protected in order to preserve revenue generating business for content producers (e.g., artists, musicians, authors, etc.) as well as content retailers (e.g., network operators, mISPs, etc.). In accordance with the present invention, the operator, mISP, or other entity can provide a sales package that includes the appropriate removable memory cards 102, such as an MMC. Each memory card will have a memory card identification (ID) 104 that is unique to each memory card 102. These memory cards 102 will be pre-loaded with content, such as, for example, ringing tones, logos, screen savers, Java, music, games, etc. In accordance with the present invention, the content is provided on the memory card 102 in a protected format. For example, in the illustrated embodiment, the content is in a protected format created by Nokia Corporation referred to herein as Secured Content Container (SCC). SCC as used herein generally refers to a container format that encapsulates encrypted digital content and metadata about the content. For example, the content may be encrypted with a symmetric key and has come associated metadata. In some cases, the digital content that is encapsulated need not be encrypted. SCC is logically associated with one or more rights files (RF), such that SCC files can be opened with the correct rights file. A rights file or "RF"

as used herein generally refers to an object that defines the rights that govern the usage of a specific piece of digital content.

The protected content is depicted in FIG. 1 as the SCC-protected content files 106. Also included on the memory card 102 is a rights database (RDB) 108. Rights files for the SCC content files 106 are held in this rights database 108. The rights database 108 itself is then placed into the SCC (or other) protected format, so that the rights files themselves are protected. The protection of the rights database 108 therefore assumes that a manner of accessing the rights files is needed. In accordance with the present invention, an encryption key for this particular SCC associated with the rights database 108 is not provided via another rights file, but rather is derived based on a different mechanism of which several options exist in accordance with the present invention.

While the present invention is generally described in connection with removable memory cards, such as the memory card 102, the present invention is equally applicable where the memory card is resident on the mobile terminal 100. For example, a substantially non-removable memory/storage card 110 in the mobile terminal 100 may include the SCC content files 106 and SCC rights database 108. For example, content may be provided in such a memory 110 along with a wireless telephone when the wireless telephone is sold to a consumer. It should therefore be recognized that the description of features associated with a removable memory card 102 are also applicable to non-removable memory/storage 110. It is also possible that content can be included on both removable 102 and non-removable 110 memories associated with a mobile terminal.

As will be described more fully below, the present invention is equally applicable where the memory card 102 is read/write memory or read-only memory (ROM). The memory card 102 may be ROM if, for example, the protection of the SCC holding the rights database 108 is sufficient, and the present invention contemplates a variety of options for providing such protection. A sufficiently secure mechanism to protect the special SCC that contains a ROM-based rights database 108 in fact provides certain advantages over a read/write memory card 102 (described more fully below), although a read/write memory card also has certain advantages over a read-only memory implementation.

In accordance with the invention, an encryption key is derived in one of a number of possible manners to gain access to the SCC-protected rights files in the rights database 108. For example, in one embodiment of the invention, the removable memory card 102 includes a pointer 114 to an activation service that is securely accessed over-the-air (OTA) which in turn provides a rights file for accessing the rights database 108. Examples of various manners of obtaining access to the SCC rights database 108 are subsequently described. Regardless of the manner in which the rights files in the rights database 108 are made accessible, one embodiment of the invention involves moving activated rights files from the rights database 108 to an active rights database 112 in the mobile terminal 100 itself, and removing the rights database 108 in the memory card 102, when the rights database 108 has been "activated" in accordance with the invention. Once activated the individual active rights files RF1, RF2, RF3, etc. associated with the active rights database 112 may be used to gain access to the secure SCC content files 106.

Figure 2:
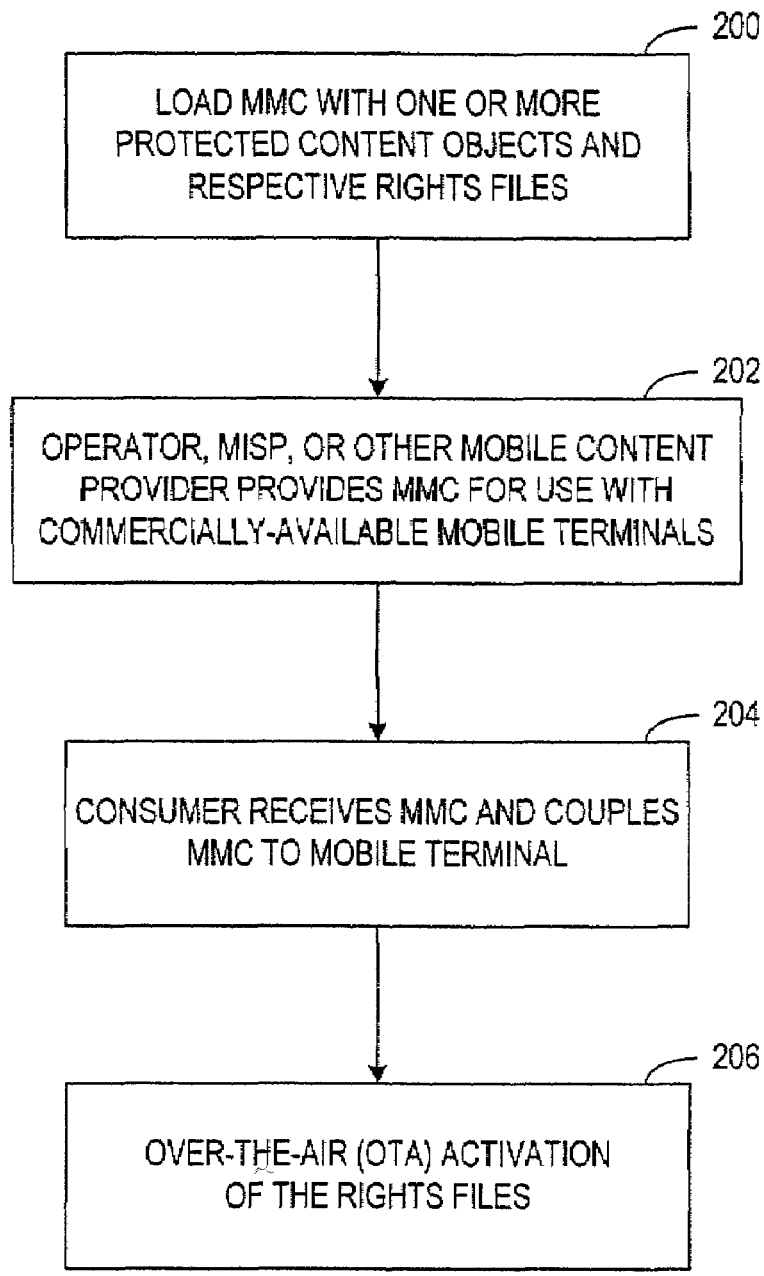
FIG. 2 is a flow diagram illustrating an exemplary method for activating pre-loaded content on a mobile device memory in accordance with the principles of the present invention.

FIG. 2 is a flow diagram illustrating an exemplary method for activating pre-loaded content on a mobile device memory in accordance with the principles of the present invention. An MMC or other portable memory device is loaded 200 with one or more protected content objects and respective rights files for the protected content objects which in one embodiment are provided as a rights database. In one embodiment, the content and rights files are protected by way of the SCC format previously described. The memory device may also be represented by a memory or storage device fixed within a mobile terminal rather than one that is insertable/removable or otherwise not fixed into a mobile terminal.

An operator, mISP, or other mobile content provider provides 202 the removable memory card (or fixed memory along with the mobile terminal) for use with commercially-available mobile terminals, such as mobile telephones, PDAs, portable computing devices, etc. The consumer receives the memory card (or other memory/storage) that has been pre-loaded with protected content, and in the case of a removable memory card couples the memory card to the mobile terminal as depicted at block 204. When the mobile user wants to access any of the protected content, the present invention facilitates secure OTA activation of the rights files that are in turn used to ascertain usage rights to specific content, as illustrated at block 206.

Figure 3:
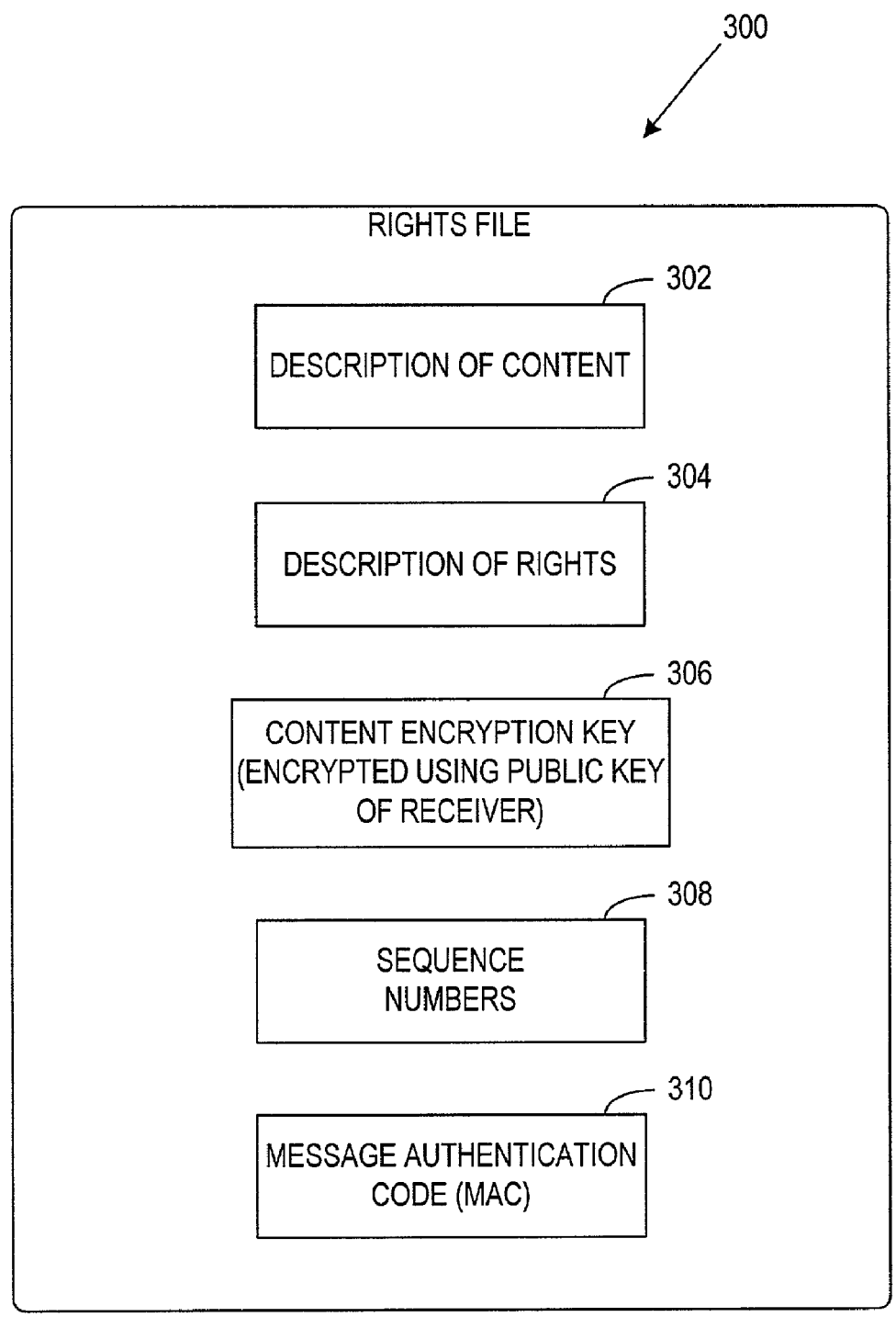
FIG. 3 is a block diagram of a representative rights file in accordance with the present invention.

The particular format or content of a rights file may vary. Therefore, while any number of rights file formats may be used in connection with the present invention, FIG. 3 is a block diagram of a representative rights file 300 in accordance with the present invention. A primary purpose of a rights file for purposes of the present invention is that it embodies the rights to a piece of content, as well as provides the means to access the content in the manner defined by the rights. Referring to the exemplary rights file 300, a description 302 of the content may be provided with the rights file, such as the type of content (e.g., audio, video, text, multimedia, etc.). Each piece of content, or selected pieces of content, will have a corresponding rights file 300, and the description 302 provides a description of its respective content.

For a particular piece of content, there is a description 304 of the rights to that content. These rights may include rights such as transfer rights and usage rights. For example, transfer rights may include the right to (or not to) give or sell the content to another user, or to give or sell a preview or other limited use of the content to another user. Transfer rights may also include rules as to whether the content can be copied to another device owned by the user. Any number of transfer rights may be included. Usage rights are policies specifying how this copy of the content may be used. For example, usage rights may include full access rights to the content, no access rights to the content, preview rights or some other limited usage rights. For example, "preview" usage rights may be provided to users for certain content upon receiving the pre-loaded memory card, to allow the user to have access to the content for a limited time (e.g., one week), a limited quantity of uses (e.g., three times), a limited amount of the content (e.g., thirty seconds of an MP3 song), etc.

The rights file 300 also includes the means to access the content as dictated by the usage rules. In one embodiment of the invention, this is provided by a content encryption key 306 that was used to encrypt the content, and the content encryption key 306 itself is encrypted using the public encryption key of the receiving device. Block 306 thus represents a desired security feature, one embodiment of which is to provide a content key encrypted using the public encryption key of the receiving device. The rights file may also contain other information, such as sequence numbers 308 to ensure freshness, and a message authentication code (MAC) 310 on all of the other fields, using the content encryption key.

Figure 4:
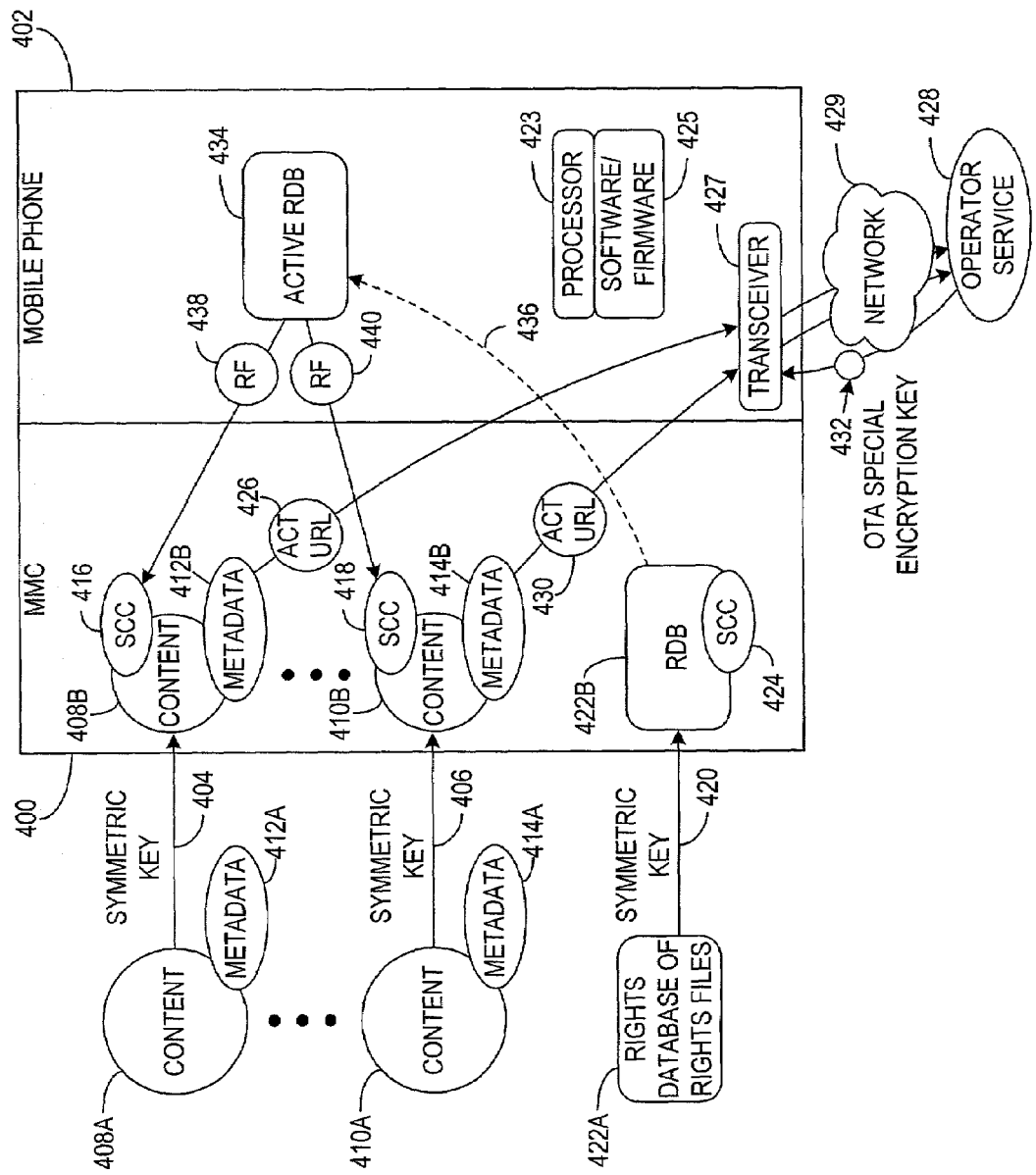
FIG. 4 is a block diagram illustrating a more particular exemplary embodiment for activating pre-loaded content on a mobile device memory in accordance with the principles of the present invention.

FIG. 4 is a block diagram illustrating a more particular exemplary embodiment for activating pre-loaded content on a mobile device memory in accordance with the principles of the present invention. The illustrated embodiment includes a removable memory card (MMC) 400 that can be plugged into a mobile device such as a mobile phone 402. The MMC 400 is pre-loaded with protected content. This is accomplished by applying a content key, such as symmetric keys 404, 406, to the content 408A, 410A that is to be loaded onto the MMC 400. The content 408A, 410A has some associated metadata 412A, 414A. The metadata 412A, 414A may include a number of information pieces, and in one embodiment includes an activation address (e.g., URL) that is accessed in order to ultimately initiate the OTA activation. The content and associated metadata is securely stored on the MMC 400 by way of SCCs. For example, the content 408A and metadata 412A are stored on the MMC 400 as protected content 408B and metadata 412B due to the SCC 416. Similarly, the content 410A and metadata 414A are stored on the MMC 400 as protected content 410B and metadata 414B due to the SCC 418. Any number of content pieces 408A, 410A may be stored on the MMC 400 in this fashion.

Also encrypted using, for example, a symmetric key 420 is the rights database (RDB) 422A, which is a database of rights files. The rights database 422A is securely stored on the MMC 400 as protected rights database 422B due to the SCC 424. A rights file is provided in the rights database 422A for each of the pieces of content 408A, 410A in which security is desired.

In order to access the encrypted content 408B, 410B, the appropriate rights file securely stored in the rights database 422B must be accessed. However, because the rights database 422B is also secured via the SCC 424, a manner of accessing the encrypted rights files in the rights database 422B is provided. In one embodiment of the invention, this is initiated after the mobile user has coupled the MCC 400 to the mobile phone 402, and when the desired content 408B, 410B is attempted to be accessed. When this occurs, an OTA activation procedure is initiated, which in one embodiment is effected using a processor 423 and associated software/firmware 425. For example, if the user attempts to access secure content 408B, an activation Uniform Resource Locator (URL) 426 or other address pointer is sent over-the-air (e.g., over one or more networks 429) to an activation service via a transceiver 427, which in the illustrated embodiment is an operator service 428. Similarly, if the user attempts to access secure content 410B, an activation URL 430 or other address pointer is sent OTA to the operator service 428. The operator 428 can be the operator from which the subscription that provided the MCC 400 was purchased, but this need not be the case as the selling operator could outsource such a service.

Further, the OTA activation procedure can be initiated automatically or semi-automatically. For example, an example of an automatic OTA activation initiation is that the OTA activation occurs without additional user intervention when the user attempts to access the content and agrees that he/she wants to use the content. Another example is that the OTA activation is initiated upon the user's first power on of the mobile terminal after the removable memory device has been coupled to the user's mobile terminal. An example of a semi-automatic OTA activation initiation is where the OTA activation occurs by prompting the user for certain input or responses. This will ultimately cause the OTA activation to occur when the user enters the appropriate user-interface entries such as by pressing a button, a combination of buttons, and/or a series of buttons on the mobile terminal to initiate OTA activation. Other user-interface mechanisms available on the mobile terminal may also be employed, such as voice-input, touch screen input, graphical user input, etc. A wide range of OTA activation automation methodologies may be implemented in accordance with the invention.

In response to receiving the activation request, the operator or other activation service 428 provides OTA activation of the protected rights database 422B by providing, for example, a special encryption key 432. With this special encryption key 432 or other security mechanism, the protection afforded the rights database 422B can be pierced, and the rights files stored therein can be accessed to then decrypt and use the requested content 408B, 410B. More particularly, the special encryption key 432 can be used to open the SCC 424, thereby making available the rights files associated with the rights database 422B.

Depending on which content piece(s) was the subject of the activation process, the appropriate rights file in the rights database 422B can now be used to access the content. For example, where the user was attempting to access the content 408B, a rights file corresponding to the content 408B will be used to access the content 408B. More particularly, the appropriate rights file from the rights database 422B may be used to open the SCC 416 file. In one embodiment, the rights file includes a content encryption key that has been encrypted using the public key of the mobile phone 402. Once the content encryption key is made available by decrypting it using the private key, the content encryption key can then open the SCC 416 and thereby activate the content 408B.

As an added security, one embodiment of the activation feature of the present invention involves loading 436 the rights database 422B to the mobile phone 402 upon the opening of the SCC 424 file, thereby creating an "active" rights database 434 within the mobile phone 402. The loading of the active rights database may occur before or after the content is activated for the first time. Further, the rights database 422B is then removed from the MMC 400, which is safer from a security standpoint and increases security of the rights files 438, 440. In this embodiment, the appropriate rights file from the rights database 434 is used to open the SCC 416 file. Therefore, from the active rights database 434, the rights files 438, 440 can be used to access the protected content 408B, 410B in accordance with the usage rights of the particular rights file.

Figure 5:
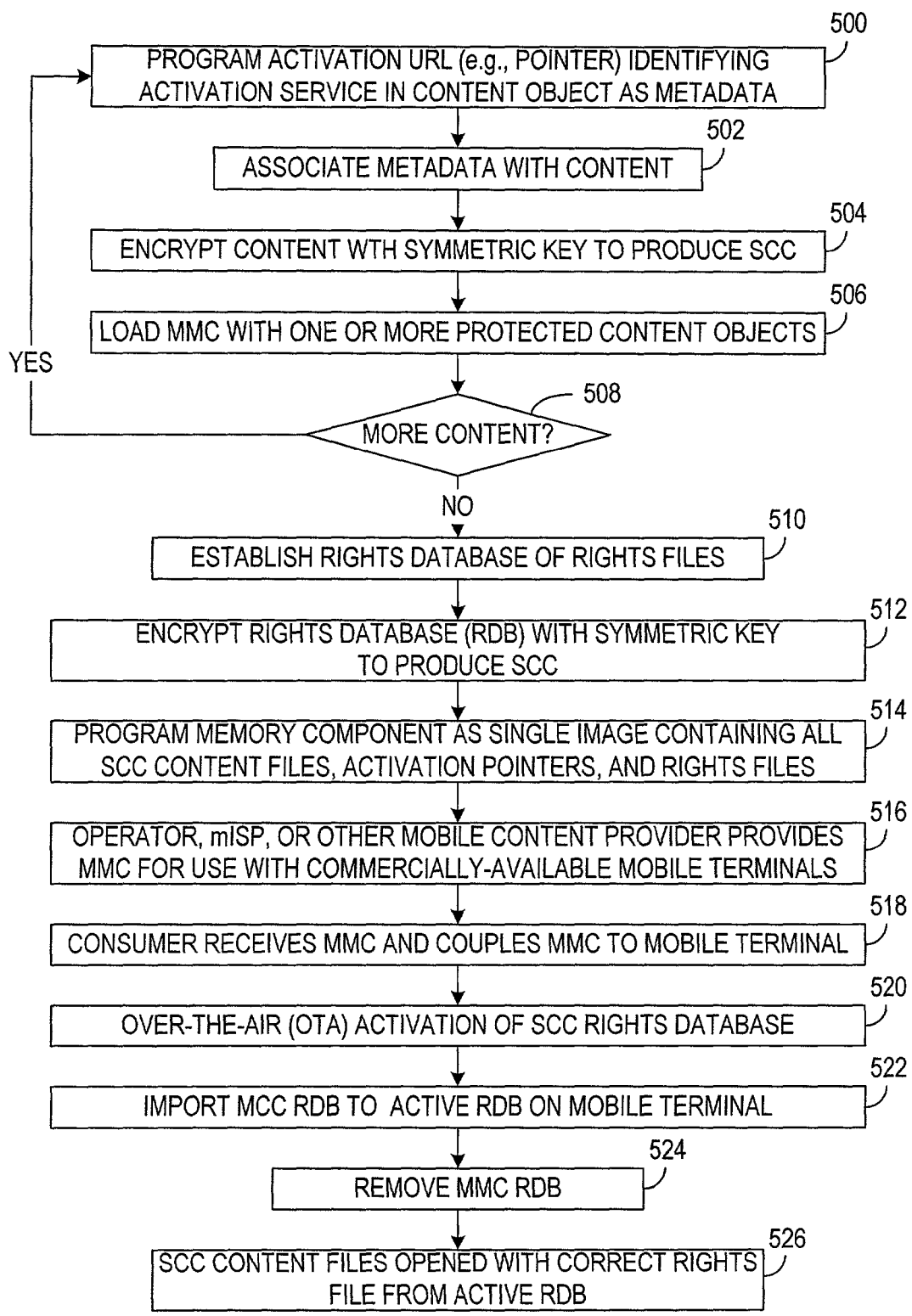
FIG. 5 is a flow diagram of an exemplary method for facilitating OTA activation of pre-loaded content by a mobile user in accordance with the present invention.

FIG. 5 is a flow diagram of an exemplary method for facilitating OTA activation of pre-loaded content by a mobile user in accordance with the present invention. In the illustrated embodiment, an activation URL or other address that identifies an activation service is programmed 500 into a content object as metadata. The activation address need not be stored as metadata, and can alternatively be separately stored and correlated with content such that the activation address is retrieved when an attempt or request to access the content occurs. The activation service may be, for example, an operator, mISP, or other content retailer. The metadata is associated 502 with the content, and the content is encrypted 504 to provide an SCC file. In one embodiment, the content is encrypted with a symmetric key. An MMC is loaded 506 with one or more protected content objects. It should be recognized that MMC is used generically herein as any removable memory device. If it is determined at decision block 508 that more content is to be loaded to the MMC, the process steps 500, 502, 504, 506 are repeated (serially or in parallel).

A rights database including one or more rights files is established 510. The rights database (RDB) is encrypted 512 with, for example, a symmetric key to produce an SCC file encapsulating the RDB. The MMC is then programmed 514 as a single image containing all of the SCC content files, activation pointers, and rights files that are available to their consumers. The operator, mISP, or other mobile content provider provides 516 the MMC for use by mobile users with any of a variety of commercially-available mobile terminals. Any mobile terminal capable of receiving and communicating with the particular type of removable memory device may be used in accordance with the present invention.

A mobile user/consumer receives the MMC, and couples it to his/her mobile terminal as illustrated at block 518. When the user chooses to access content that is securely stored on the MMC, an OTA activation of the SCC rights database is effected, as illustrated at block 520. The rights database in the MMC is imported 522 into the mobile terminal as an active rights database, and the rights database at the MMC is removed 524 for security purposes. Using the appropriate rights files in the active rights database, the SCC content files can be opened 526.

Figure 6:
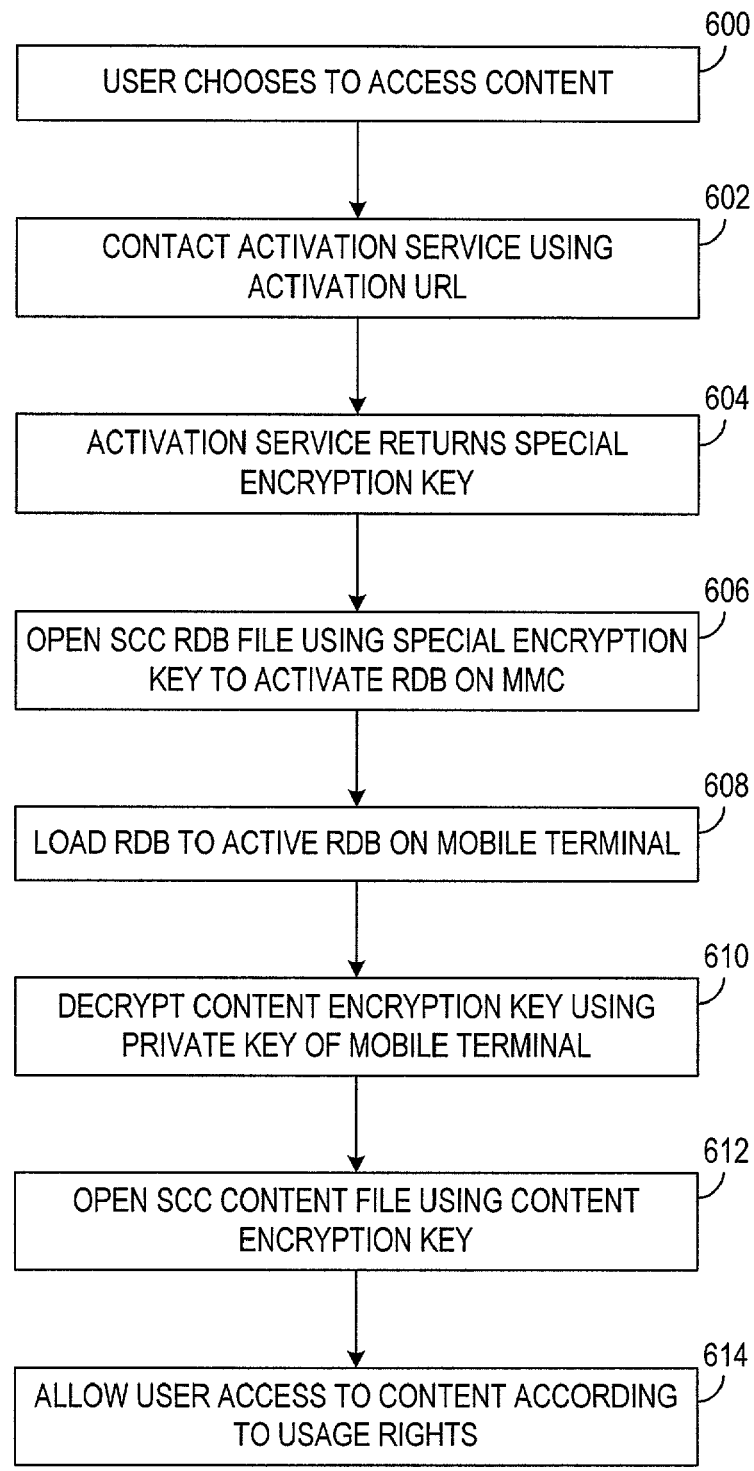
FIG. 6 is a flow diagram illustrating an exemplary methodology for effecting OTA activation of secured content in accordance with one embodiment of the invention.

Referring now to FIG. 6, a flow diagram is provided illustrating an exemplary methodology for effecting OTA activation of secured content in accordance with one embodiment of the invention. The mobile user chooses to access a particular piece(s) of content as shown at block 600. An activation URL or other activation address is used to contact the activation service as shown at block 602. In one embodiment of the invention, the activation address/URL is stored as metadata associated with the requested content. The activation service returns 604 a special encryption key or other decryption mechanism, and the SCC rights database on the portable memory device is opened 606 using the encryption key. The rights database is imported or otherwise loaded 608 to an active rights database on the mobile terminal rather than on the MMC. A content encryption key within the rights file corresponding to the requested content is decrypted 610 using a private key of the mobile terminal. With the content encryption key, the SCC content file can be opened 612, thereby allowing the user to access 614 the requested content according to the usage rights set forth in the rights file.

Figure 7:
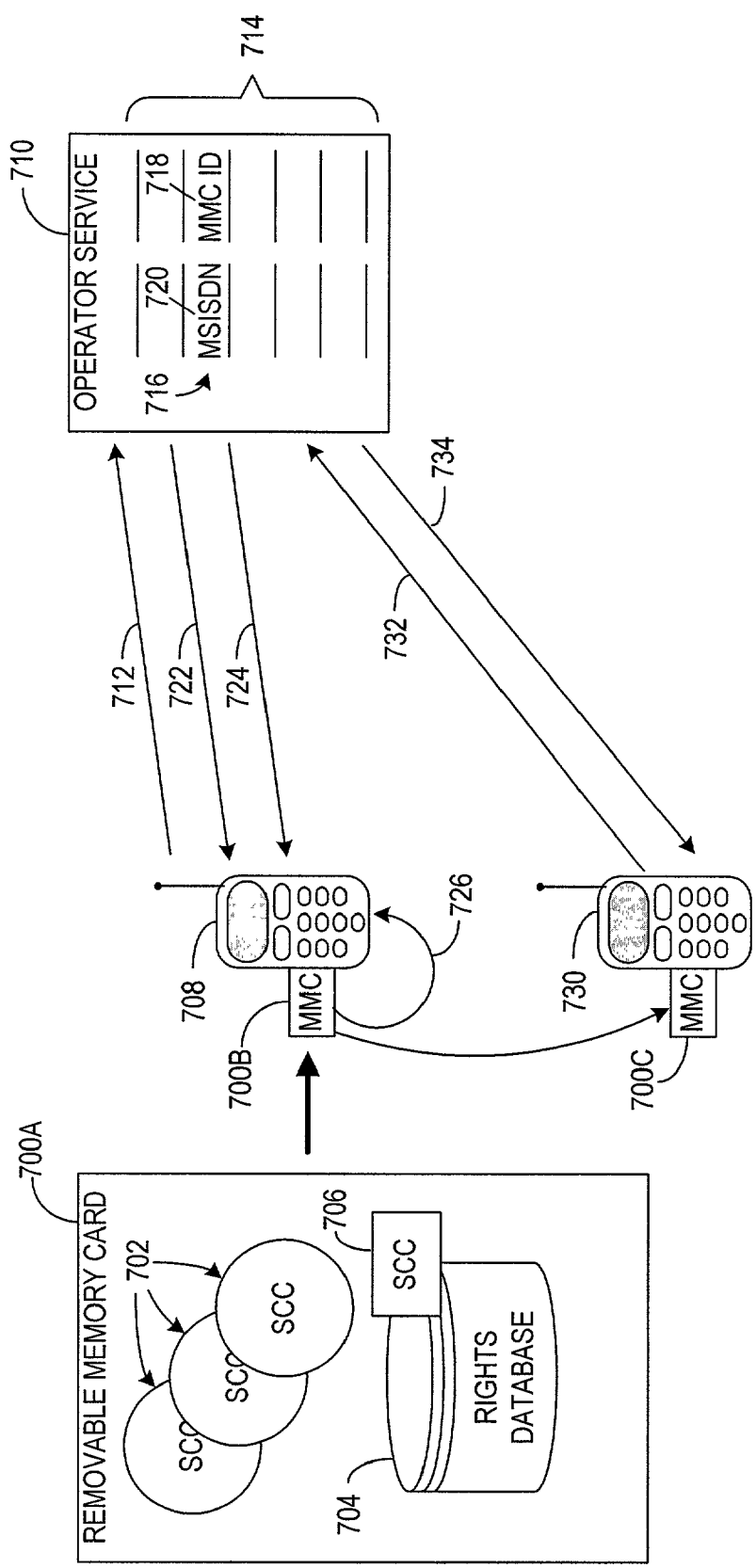
FIG. 7 illustrates an exemplary messaging sequence that may be implemented to effect the OTA activation in accordance with the present invention.

FIG. 7 illustrates an exemplary messaging sequence that may be implemented to effect the OTA activation in accordance with the present invention. While the content may be stored on a fixed memory (e.g., ROM) within the mobile terminal, the illustrated embodiment is described in terms of a removable memory card 700A. The memory card 700A includes content protected using the SCC format described above, resulting in one or more SCC files 702. The rights database 704 is also encapsulated into an SCC file 706, thereby locking the rights database 704 until OTA activation is performed in accordance with the invention. The memory card 700A is inserted or otherwise coupled to the user's mobile terminal, such as a wireless device 708, as depicted by the inserted memory card 700B.

When the user wants to access content on the memory card 700B, an activation URL or other activation address is automatically or semi-automatically sent OTA to the destination activation service 710, as illustrated by wireless transmission path 712 which in one embodiment is a WAP transmission. The activation address and any accompanying data may be transmitted using any known wireless transmission protocol or messaging service, such as WAP, SMS, EMS, MMS, GPRS, etc. In the illustrated embodiment, the activation service 710 is an operator, such as the operator to whom the user has subscribed with. Also included in this OTA transmission 712 may be identification information, such as a equipment identifier (e.g., International Mobile Equipment Identity (MEI)), subscriber information (e.g., Mobile Station ISDN/PSTN Number (MSISDN)), and a memory card identifier (e.g., MMC ID). This information will be used by the operator service 710 to determine whether the requesting subscriber/terminal is a valid subscriber entitled to obtain the requested content activation.

In the illustrated embodiment, the operator 710 has a list/database of subscribers 714. Each entry, such as entry 716, includes identification information for the subscriber. For example, the information may includes an MMC ID 718 which is an identifier for the memory device that was provided to the user corresponding to the stored subscriber information (e.g., MSISDN 720). The MSISDN is a mobile number used by GSM/DCS networks that contains information such as the country code, national destination code, HLR identifier and a subscriber number. Any other similar identifier can be used, and the particular wireless network will in some cases dictate the type of subscriber identifier used. Still other identifiers may be included in the operator service 710 database, such as those associated with the equipment itself (e.g., IMEI), or a Subscriber Identity Module (SIM), Wireless Identity Module (WIM), etc. Various manners of binding to the services are described more fully below.

The operator service 710 receives the information provided via path 712, and determines whether a corresponding entry 716 exists in the operator 710 database. If so, the operator may optionally send a message via path 722 to the wireless device 708 that the operator 710 has agreed to activate the content. The operator 710 then provides the appropriate rights file to activate the content, as illustrated on path 724. For example, this may be in the form of an Short Message Service (SMA) message or Wireless Application Protocol (WAP) push message to provide the rights file for the rights database 704 in the MMC 700B. The rights file may include, for example, a special encryption key to open the rights database 704 SCC at the MMC 700B.

Upon receiving the encryption key via path 724, the wireless device opens the rights database 704 at the MMC 700B, thereby activating the rights database 704 and allowing the content to be accessed as dictated by its respective rights file. Further, the MMC 700B rights database is then loaded as an active rights database to the wireless device 708, as depicted by line 726. The rights database 704 stored on the MMC 700B is then removed, and the active rights database within the wireless device 708 itself serves as the rights database of rights files for activating the content 702.

Figure 8:
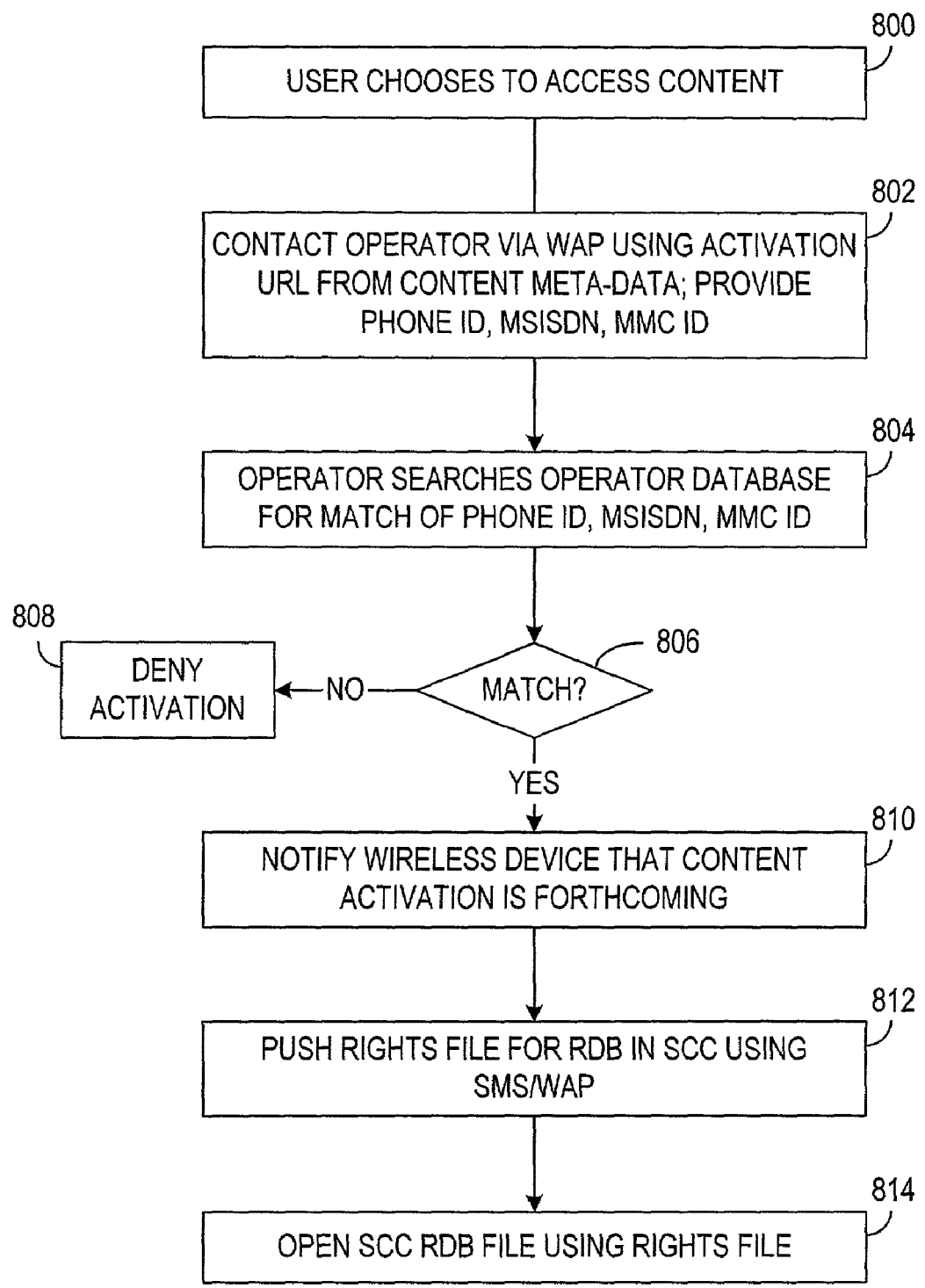
FIG. 8 illustrates a flow diagram of an exemplary manner of effecting OTA activation through communications between a wireless device and an operator activation service in accordance with the present invention.

Referring briefly to FIG. 8 before returning to FIG. 7, a flow diagram is provided which generally corresponds to the OTA activation described above in connection with FIG. 7. FIG. 8 is thus a flow diagram illustrating an exemplary manner of effecting OTA activation through communications between a wireless device and an operator activation service in accordance with the present invention. The wireless device user chooses to access a particular piece(s) of content as shown at block 800. In the illustrated embodiment, the operator is contacted via Wireless Application Protocol (WAP) or other technology (e.g., SMS, EMS, MMS, GPRS, etc.) using the activation URL from the content metadata. Also provided to the activation service as depicted at block 802 is the wireless device identification (i.e., phone ID), the MSISDN, and an identification of the removable memory card (MC ID). Using this information, the operator searches 804 a database to determine whether the information provided by the wireless device matches information in the operator database. If no match is found as determined at decision block 806, activation is denied 808. If a match is found, activation is allowed, and the operator may optionally notify 810 the wireless device that content activation is forthcoming.

In the illustrated embodiment, the operator pushes 812 the rights file for the rights database (RDB) in the SCC to the wireless device. For example, an SMS or WAP "push" may be used. As is known in the art, push technology generally refers to a means to transmit information without a previous user action, i.e., a server-initiated transaction. Push technologies can be used in connection with various protocols and communication technologies. For example, some representative push technologies include SMS, WAP Push, MMS, Session Initiation Protocol (SIP), as well as others. When the rights file has been received at the wireless device, the SCC file including the rights database may be opened 814.

Various operator service options may be used in connection with the present invention, where these service options identify various of "binding" activation to a user/subscriber or device. In this manner, subsequent activation may or may not be allowed, depending on the binding mechanism employed and what subscriber parameters are associated with a subsequent activation attempt. A subsequent activation request may occur, for example, where the subscriber purchases a new mobile terminal and wants to access the content previously purchased via the MMC, or where the subscriber has multiple mobile terminals that can receive the MMC. To what the operator service binds activation will determine whether the subscriber can activate the MMC content on another device. On this point, attention is directed back to FIG. 7.

The present invention is applicable to any type of content memory, including any flash card, or any flash memory including non-removable memory. The invention is applicable to read/write memories, and is further applicable to read-only memories (ROM) if the protection of the SCC 706 holding the rights database 704 is sufficient. In other words, where the MMC 700A is a read/write memory, the active rights database may be removed from the MMC 700A as described above, which provides protection because the memory card no longer houses the rights database. However, ROM is less expensive than read/write memory, and it would be desirable to utilize read-only memory cards 700A if possible from a security standpoint. A sufficiently secure mechanism to protect the special SCC 706 holding the rights database 704 would enable the use of ROM cards 700A as there would no longer be a need to delete the rights database from the memory card 700A after the wireless device 708 has imported the rights database 704. Further, the use of ROM cards 700A would obviate the need to turn on the wireless terminal during a manufacturing process where the memory cards 700A are being pre-installed into the mobile terminal. It would no longer be necessary to turn on the mobile terminal during manufacturing because the rights database could not be removed from the ROM card. One aspect of the present invention addresses this issue, and provides a solution allowing the use of read-only memory cards 700A while providing a sufficiently secure manner of protecting the content on the memory card through operator service "binding" methods.

Furthermore, the MMC 700B, whether ROM or read/write memory, may for one reason or another be moved to a different wireless device 730. A user may purchase a new mobile device 730, or alternatively an unauthorized person may have obtained the MMC 700B and inserted it into his/her mobile device 730. The present invention addresses these issues and provides a manner of authorizing subsequent activation to authorized users while minimizing the chance that unauthorized users will be able to access the content on the MMC 700C.

First assume the case where the removable memory card 700A/B is a ROM device. In such a case, the ROM cannot be written to, and the rights database 704 stored thereon will not be removed after activation. This could present a risk, as the MMC 700B could be obtained by an unauthorized person and attempted to be used in another mobile device 730. Because the rights database 704 is still stored on the MMC 700C (although SCC-protected), there is still a chance that the content could be inappropriately activated. However, the operator service 710 can bind activation to one or more predetermined mobile-specific parameters, such as the IMEI, SIM ID, WIM ID, etc. As previously indicated with respect to transmission 712, a number of mobile-specific parameters may be provided when the user attempts to access content and thus initiates the activation process. The operator service 710 can bind subsequent activation to one or more of these mobile-specific parameters. For example, assume that the initial activation included providing a terminal ID such as an IMEI, as well as the MSISDN and the MMC ID. The operator service 710 can bind activation to any of these parameters, such as the IMEI. In such a case, subsequent activation attempts would have to exhibit the same IMEI in order to obtain the encryption key to decrypt the SCC 706 protecting the rights database 704 on the ROM-based memory card 700C. If an unauthorized user tried to activate the content on the MMC 700C, and the IMEI of wireless device 730 is different from the IMEI of the original wireless device 708 to which activation is bound, the content will not be activated.

Binding may also be used in the case where the memory is a read/write memory card 700A. The MMC 700C is inserted or otherwise coupled to the wireless device 730. In a situation where the rights database was not moved from the MMC 700B to the wireless device 708, the rights database that remains in the MMC 700C can be used to attempt to reactivate the content from the wireless device 730 as described above. Without the binding mechanisms, the protection afforded when the rights database is moved from the MMC 700B to the wireless device 708, and removed from the MMC 700B, can prevent a person from obtaining access to content on the MMC 700C. For example, assuming that the rights database 704 was moved from the MMC 700B to the wireless device 708, an unauthorized person who obtains the MMC 700B will not be able to activate the content in MMC 700C on the wireless device 730, because the rights database was removed from the MMC 700C. On the other hand, the authorized subscriber may be able to move the AMC 700B to another wireless device 730, depending on the manner in which the operator service 710 has bound the activation. For example, if the operator 710 has opted to bind activation to the first device in which activation is requested (e.g., wireless device 708), then activation will not be allowed for a device having a different equipment identifier (e.g., wireless device 730). Alternatively, if the operator 710 has opted to bind activation to the first SIM/MSISDN from which activation was requested, then activation will not be allowed for a device 730 associated with a different subscriber identification. Another option is to bind activation to any device if the correct SIM is present. A number of variants are possible. In any event, OTA activation is attempted at the new wireless device 730 as shown by transmission path 732, and activation is allowed/disallowed as indicated by path 734 depending on the circumstances and how the operator has bound the activation.

Figure 9A:
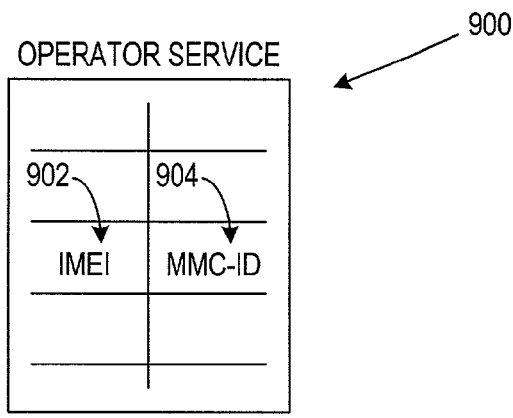
FIG. 9, including FIGS. 9A, 9B, and 9C, provides representative examples of various operator service binding options.
Figure 9B:
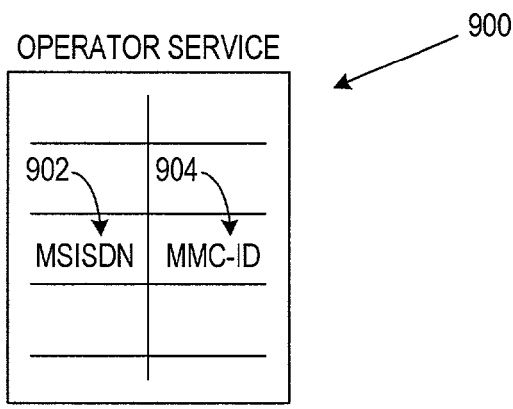
Figure 9C:
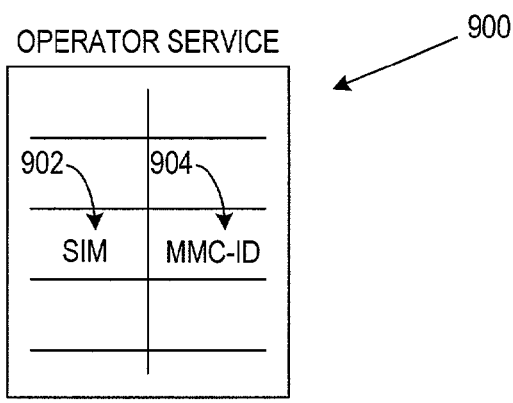

FIG. 9, including FIGS. 9A, 9B, and 9C, provides representative examples of various operator service binding options. In the example of FIG. 9A, the operator service 900 stores one or more binding parameters 902 that correspond to the particular memory device identification (e.g., MMC ID 904). In the embodiment of FIG. 9A, the binding parameter 902 is an equipment identifier, such as an International Mobile Equipment Identity (IMEI). This operator service option thus binds to the first device (IMEI) from which activation was requested. Subsequent activation attempts thus require that the same device that first obtained activation be the device that subsequently requests activation. In this manner, the SIM or other subscriber information could change, and subsequent activation would be allowed as long as the same device that first requested activation makes the subsequent activation. In the example of FIG. 9B, the operator service 900 stores an MSISDN as the binding parameter 902. This operator service option thus binds to the first MSISDN from which activation was requested. Similarly, in FIG. 9C, the operator service 900 stores a SIM as the binding parameter 902, thereby binding to the first SIM from which activation was requested. In another embodiment, activation can re-bind to any device once the correct SIM is present. A variety of other binding parameters may also be used, such as a Wireless Identity Module (WIM), etc.

Using the foregoing specification, the invention may be implemented as a machine, process, or article of manufacture by using standard programming and/or engineering techniques to produce programming software, firmware, hardware or any combination thereof.

Any resulting program(s), having computer-readable program code, may be embodied within one or more computer-usable media such as memory devices or transmitting devices, thereby making a computer program product or article of manufacture according to the invention. As such, the terms "article of manufacture" and "computer program product" as used herein are intended to encompass a computer program existent (permanently, temporarily, or transitorily) on any computer-usable medium such as on any memory device or in any transmitting device.

Executing program code directly from one medium, storing program code onto a medium, copying the code from one medium to another medium, transmitting the code using a transmitting device, or other equivalent acts, may involve the use of a memory or transmitting device which only embodies program code transitorily as a preliminary or final step in making, using, or selling the invention.

Memory devices include, but are not limited to, hard disk drives, diskettes, optical disks, magnetic tape, semiconductor memories such as RAM, ROM, PROMS, etc. Transmitting devices include, but are not limited to, the Internet, intranets, telephone/modem-based network communication, hard-wired/cabled communication network, cellular communication, radio wave communication, satellite communication, and other stationary or mobile network systems/communication links.

A machine embodying the invention may involve one or more processing systems including, but not limited to, CPU, memory/storage devices, communication links, communication/transmitting devices, servers, I/O devices, or any subcomponents or individual parts of one or more processing systems, including software, firmware, hardware, or any combination or subcombination thereof, which embody the invention as set forth in the claims.

From the description provided herein, those skilled in the art are readily able to combine software created as described with appropriate general purpose or special purpose computer hardware to create a computer system and/or computer subcomponents embodying the invention, and to create a computer system and/or computer subcomponents for carrying out the method of the invention.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for allowing access to secure content via a mobile terminal, comprising:
   providing a removable memory device for coupling to the mobile terminal, wherein the removable memory device is pre-programmed with at least one item of secure content and a secure rights database of rights files;
   conducting over-the-air (OTA) activation of the secure content stored on the removable memory device in response to an attempt to access the secure content; and
   enabling access to the secure content as dictated by corresponding rights files when the OTA activation has successfully completed.

2. The method of claim 1, wherein conducting OTA activation comprises:
   disabling a security feature protecting the secure rights database on the removable memory device in response to OTA activation information received at the mobile terminal;
   importing the rights files associated with the secure rights database from the removable memory device to an active rights database in the mobile terminal; and
   disabling further use of the secure rights database on the removable memory device.

3. The method of claim 2, wherein the OTA activation information is an encryption key, and wherein disabling a security feature comprises decrypting the secure rights database using the encryption key.

4. The method of claim 2, wherein disabling further use of the secure rights database comprises deleting the secure rights database from the removable memory device after its importation to the active rights database.

5. The method of claim 2, wherein importing the rights files to an active rights database and disabling further use of the secure rights database collectively comprise moving the rights files from the secure rights database to the active rights database, thereby removing the secure rights database.

6. The method of claim 2, wherein disabling further use of the secure rights database comprises overwriting the secure rights database with data different from data associated with the secure rights database.

7. The method of claim 2, wherein disabling further use of the secure rights database comprises binding one or more mobile-specific parameters to a first OTA activation at the activation service, and preventing access to the secure rights database on the removable memory card if the mobile-specific parameters accompanying a subsequent OTA activation attempt do not correspond to the mobile-specific parameters stored at the activation service.

8. The method of claim 1, wherein enabling access to the secure content comprises decrypting the secure content using a corresponding one of the rights files from the active rights database, and allowing use of the secure content as dictated by usage rights associated with that rights file.

9. The method of claim 8, further comprising extracting a content encryption key from the rights file, and wherein decrypting the secure content using a corresponding one of the rights files comprises decrypting the secure content using the content encryption key.

10. The method of claim 9, further comprising decrypting the content encryption key using a private key of the mobile terminal.

11. The method of claim 1, further comprising initiating the OTA activation at the mobile terminal by contacting an activation service using an activation service address provided as metadata with the secure content to which access is desired.

12. The method of claim 1, wherein providing a removable memory device comprises shipping the removable memory device to a consumer who begins a subscription with a network operator.

13. A method for facilitating access to secure content via a mobile terminal, comprising:
providing a removable memory device pre-programmed with at least one item of secure content and a secure rights database of rights files, wherein each item of secure content is associated with an activation address;
initiating an over-the-air (OTA) activation request from the mobile terminal equipped with the removable memory device to an activation service identified by the activation address;
removing a security feature protecting the secure rights database to make available the corresponding rights database, in response to information received OTA from the activation service;
importing the rights database from the removable memory device to an active rights database in the mobile terminal; and
disabling the rights database on the removable memory device.

14. The method of claim 13, wherein the activation address is provided via metadata associated with the secure content that is being accessed.

15. The method of claim 13, further comprising binding subsequent OTA activations to one or more mobile parameters provided in a previous activation with the activation service, and allowing subsequent OTA activation if the mobile parameters correspond to the mobile parameters obtained from the previous activation.

16. The method of claim 15, wherein binding subsequent OTA activations comprises storing the one or more of the mobile parameters accompanying the previous activation at a location accessible to the activation service.

17. The method of claim 15, wherein the mobile parameters comprise any one or more predetermined unique identifiers.

18. The method of claim 15, wherein the mobile parameters comprise one or more of a mobile terminal identifier, a subscriber identifier, and a mobile terminal address.

19. The method of claim 15, wherein the mobile parameters comprise one or more of a Subscriber Identity Module (SIM) identifier, Wireless Identity Module (WIM) identifier, Mobile Station ISDN/PSTN Number (MSISDN), and an International Mobile Equipment Identity (IMEI).

20. The method of claim 13, wherein the information received from the activation service is at least one encryption key capable of decrypting the secure rights database to make available the corresponding rights database.

21. The method of claim 13, further comprising using the rights files in the active rights database to access respective secure content on the removable memory device, wherein access rights to the secure content is defined by its respective one of the rights files.

22. The method of claim 21, further comprising decrypting the secure content using a content encryption key stored within the rights file.

23. The method of claim 22, further comprising decrypting the content encryption key using a private key of the mobile terminal.

24. The method of claim 13, wherein initiating an OTA activation request comprises automatically initiating the OTA activation request upon coupling the removable memory device to the mobile terminal and powering on of the mobile terminal.

25. The method of claim 13, wherein initiating an OTA activation request comprises automatically initiating the OTA activation request upon coupling the removable memory device to the mobile terminal and attempting to access the secure content on the removable memory device.

26. The method of claim 13, wherein initiating an OTA activation request comprises semi-automatically initiating the OTA activation request by activating at least one user-interface mechanism on the mobile terminal.

27. The method of claim 13, further comprising creating the active rights database in response to the information received OTA from the activation service.

28. A mobile terminal, comprising:
a memory card pre-programmed with at least one item of secure content and a secure rights database of rights files, wherein each item of secure content has associated metadata which includes an activation address;
a transceiver to send and receive over-the-air (OTA) transmissions between the mobile terminal and an activation service identified by the activation address;
an active rights database; and
a processor configured to send an OTA activation request via the transceiver to the activation service and receive an OTA activation response from the activation service via the transceiver, to decrypt the secure rights database using an encryption key provided via the OTA activation response and import the rights files from the memory card into the active rights database, and to disable the secure rights database on the memory card from unauthorized use.

29. The mobile terminal of claim 28, wherein the processor is further configured to disable the secure rights database by removing the secure rights database from the memory card upon successful importation of the rights files into the active rights database.

30. The mobile terminal of claim 28, wherein the processor is further configured to disable the secure rights database by overwriting the secure rights database on the memory card upon successful importation of the rights files into the active rights database.

31. The mobile terminal of claim 28, wherein the processor is further configured to decrypt the secure content using a corresponding one of the rights files from the active rights database, and to facilitate use of the secure content as defined by usage rights associated with the corresponding rights file.

32. The mobile terminal of claim 31, wherein the processor is further configured to decrypt the secure content by extracting a content encryption key from the rights file.

33. The mobile terminal of claim 32, wherein the processor is further configured to extract the content key from the rights file by decrypting the content encryption key using a private key of the mobile terminal.

34. The mobile terminal of claim 28, wherein the memory card is a removable memory card.

35. The mobile terminal of claim 28, wherein the memory card is a read-only memory.

36. The mobile terminal of claim 28, wherein the memory card is a read/write memory.

37. The mobile terminal of claim 28, wherein the memory card is a substantially non-removable memory card coupled to circuitry of the mobile terminal.

38. The mobile terminal of claim 28, wherein the mobile terminal is at least one of a mobile telephone, personal digital assistant, portable computing device, and mobile music player.

39. A system for distributing content on removable memory devices in a secure manner, comprising:
a network for communicating wireless data transmissions;
a network activation service coupled to the network and accessible via a network address;
a plurality of mobile terminals capable of communicating wireless data transmissions via the network, each mobile terminal comprising:
(a) a removable memory card pre-programmed with at least one item of secure content and a secure rights database of rights files, wherein each item of secure content has associated metadata which includes the network address of the network activation service;
(b) a transceiver to communicate wireless data transmissions between the mobile terminal and the network activation service;
(c) an active rights database; and
(d) a processor configured to send a wireless activation request via the transceiver to the network activation service and receive a wireless activation response from the network activation service via the transceiver, to decrypt the secure rights database using an encryption key provided via the wireless activation response and import the rights files from the removable memory card into the active rights database, and to disable the secure rights database on the removable memory card from unauthorized use.

40. The system of claim 39, wherein the network activation service comprises a network operator that provides subscriptions to mobile terminal users for access to the network.

41. A computer-readable medium having computer-executable instructions for allowing access to secure content via a mobile terminal, wherein the secure content, associated metadata, and a secure rights database of rights files is provided on a pre-programmed portable memory device, the computer-executable instructions performing steps comprising:
obtaining an address of an activation service from the metadata associated with the secure content to which user access is requested;
initiating an over-the-air (OTA) content activation with an activation service corresponding to the activation service address;
disabling a security feature that is protecting the secure rights database to make available the corresponding rights database in response to an encryption key received over-the-air from the activation service;
importing the rights database from the portable memory device to an active rights database in the mobile terminal; and
prohibiting further access to the rights database on the portable memory device.

42. A method for conducting over the air (OTA) activation of pre-programmed secure content stored in a memory device coupled to a mobile terminal, comprising:
receiving, in an activation service, a secure content access request from the mobile terminal via a wireless network; and
returning a rights file for accessing a secure rights database stored in the memory device coupled to the mobile terminal, the secure rights database containing rights files for accessing the pre-programmed secure content in the memory device.

43. The method of claim 42, wherein the rights file comprises an encryption key capable of decrypting the secure rights database.

44. The method of claim 42, wherein receiving the secure access request comprises receiving an address pointer.

45. The method of claim 44, wherein the address pointer comprises a Uniform Resource Locator (URL).

46. The method of claim 42, further comprising binding subsequent activations to one or more mobile parameters provided in a previous activation with the activation service, and allowing subsequent OTA activation if the mobile parameters correspond to the mobile parameters obtained from the previous activation.

47. The method of claim 46, wherein binding subsequent OTA activations comprises storing the one or more mobile parameters accompanying the previous activation at a location accessible to the activation service.

48. The method of claim 46, wherein the mobile parameters comprise any one or more predetermined unique identifiers.

49. The method of claim 46, wherein the mobile parameters comprise one or more of a mobile terminal identifier, a subscriber identifier, and a mobile terminal address.

50. The method of claim 46, wherein the mobile parameters comprise one or more of a Subscriber Identify Module (SIM) identifier, Wireless Identity Module (WIM), identifier, Mobile Station ISDN/PSTN Number (MSISDN), and an International Mobile Equipment Identity (IMEI).

51. An over the air (OTA) activation service, comprising a server coupled to a mobile terminal via a wireless network, the server configured to receive a secure content access request from the mobile terminal via the wireless network, and, responsive to the secure content access request, provide to the mobile terminal a rights file for accessing a pre-programmed secure rights database stored in a memory device coupled to the mobile terminal, the secure rights database containing rights files for accessing pre-programmed secure content stored in the memory device.

52. The activation service of claim 51, wherein the rights file comprises an encryption key capable of decrypting the secure rights database.

53. The activation service of claim 51, wherein the secure access request comprises an address pointer to the activation service.

54. The activation service of claim 53, wherein the address pointer comprises a Uniform Resource Locator (URL).

55. The activation service of claim 51, wherein the server is further configured to bind subsequent activations to one or more mobile parameters provided in a previous activation with the activation service, and to allow subsequent OTA activation if the mobile parameters correspond to the mobile parameters obtained from the previous activation.

56. The activation service of claim 55, wherein the server is configured to store the one or more mobile parameters accompanying the previous activation at a location accessible to the activation service.

57. The activation service of claim 55, wherein the mobile parameters comprise one or more of a mobile terminal identifier, a subscriber identifier, and a mobile terminal address.

58. A memory device configured to couple to a mobile terminal, the memory device comprising:
   at least one item of pre-programmed secure content;
   a pre-programmed secure rights database of rights files associated with the at least one item of secure content; and
   a pointer to an activation service that provides a rights file for the secure rights database for over the air activation of the at least one item of pre-programmed secure content.

* * * * *